Patented Aug. 30, 1938

2,128,354

UNITED STATES PATENT OFFICE 2,128,354

DRYING OIL

Eric William Fawcett, Northwich, and Eric Everard Walker, Blackley, Manchester, England, assignors to Imperial Chemical Industries Limited, a corporation of Great Britain No Drawing. Application November 22, 1934, Serial No. 754,368. In Great Britain November 24, 1933

10 Claims. (Cl. 87—12)

In British specification No. 422,941 it is shown that oils with improved film forming properties may be obtained by subjecting polymerized drying oils to a distillation process whereby the more volatile portion is removed. The portion removed comprises that part of the original oil which is incapable of polymerization, i. e. the more saturated glycerides; it also contains any other unpolymerized material which may be present because the polymerization may not have been carried to completion.

Drying oils, for example, perilla, linseed, tung, poppy and soya bean oils (cf. The Chemistry of Drying Oils, Morrell and Wood, London, 1925, p. 47) may be polymerized in various ways to give products known to the trade by different names; e. g. "stand oils" are prepared by heating drying oils in substantial absence of air and without addition of driers at 250°–320° C. for varying lengths of time; "blown oils" are oils polymerized by heating at lower temperatures e. g. 100°–150° C. and simultaneously oxidized by passing a current of air through the hot oil (cf. Morrell and Wood, loc. cit., pp. 155–157). Other methods of polymerizing drying oils are known, e. g. heat treatment in the presence of catalysts, treatment with ultraviolet light, treatment with a silent electric discharge. All such polymerized oils may be distilled as described above to give products which have superior film forming properties and which may be employed to advantage in the paint and varnish, printing ink and linoleum industries.

Fish oils although not commonly classed as drying oils are polymerizable by processes similar to those described above as applicable to the vegetable drying oils.

The present invention relates to the production of oils adapted for use as paint or varnish ingredients from certain polymerized fish oils, namely those obtained by polymerizing fish oils of iodine value above 120, such as, for example, menhaden oil, Japanese sardine oil, herring oil and Canadian pilchard oil (cf. Morrell and Wood, loc. cit., pp. 74–81).

It is known to submit fish oils to polymerization by heat treatment followed by a distillation in the presence of an inert gas or in a relatively low vacuum. In British specification 196,623 the distillate consists of the fatty acids volatile below the carbonizing temperature of the oil.

In British specification 121,777 which corresponds to U. S. Patent 1,438,221 the distillate consists of non-polymerizable fatty acids with or without glycerin. Similarly in British specification 6,463 of 1913, which corresponds to U. S. Patent 1,121,925, fatty acids, glycerine and acrolein distil over, and in British specification 15,012 of 1912, which corresponds to U. S. Patent 1,087,044, the distillate consists of fatty acids and glycerine.

The distillation processes of the above mentioned specifications result in appreciable decomposition of the fish oil. Furthermore, it has not hitherto been possible to remove from a polymerized fish oil by distillation those non-polymerizable or non-polymerized glycerides which if allowed to remain in the oil adversely affect its drying properties.

We have now found that by subjecting certain polymerized fish oils to a special distillation process a satisfactory removal of non-polymerizable or non-polymerized glycerides is obtained, resulting in oils of improved drying properties.

According to the invention we submit polymerized fish oils as hereinbefore described to a distillation treatment at a high vacuum preferably at a cathodic vacuum, e. g. a vacuum of the order of a few thousandths of a millimeter of mercury, as described in British specification No. 422,941, to remove the portion that has not polymerized (either because it cannot polymerize or because the treatment has not been carried so far that polymerization is complete). The residue then is a clear viscous oil adapted for use as a paint or varnish ingredient or in other ways; it does not deposit stearin-like material on standing; that is, it is much less greasy than the original fish oil. Furthermore it has lost almost entirely the characteristic and offensive fishy odour.

On dilution with a thinner, e. g. turpentine, and the addition of drier, e. g. cobalt linoleate, a clear varnish is obtained which dries more rapidly than a similar varnish based on the untreated oil and gives a clearer smoother and harder film.

The invention is illustrated but not limited by the following examples in which the parts are by weight.

Example 1

The polymerized product obtained by heating 1000 parts of Japanese pale sardine oil (iodine value: 173 to 174) to 290–300° C. in an evacuated vessel (2–5 mm. mercury pressure) until the viscosity is 75–80 poises at 20° C. and the iodine value is approximately 103, is passed at 240° C. through a distilling apparatus under high vacuum, e. g. as described in British Patents Nos. 315,186 and 303,078; the vacuum being of the order of that in cathode ray tubes. 290 parts were distillate.

A vacuum of the order of one dyne per square centimeter, i. e. 0.00075 mm. Hg. may be used. In the distilling apparatus as described in British specification 315,186, the distilling surface and condensation surface are preferably of the molecular still type, i. e. one in which the distance of separation is less than that of the mean free path of the molecules as disclosed in British specification 422,941.

The residue is a brown oil with a viscosity of 385 poises at 20° C. and an iodine value of 103 to 104. Its film forming properties are very much superior to those of untreated bodied oil. Thus, when 50 parts of the product are diluted with 26 parts of xylene and 1.25 parts of 4 per cent cobalt linoleate (equivalent to 0.1 per cent cobalt on quantity of oil) are added a varnish is obtained which dries in about 8-20 hours to a clear fairly hard film with a good gloss. A similar varnish from Japanese pale sardine oil merely bodied as described dries much more slowly and gives a much softer film which moreover is disfigured by the separation of stearin-like materials.

Example 2

The polymerized product obtained by heating 1000 parts of Japanese pale sardine oil (iodine value 186) at 290–300° C. in an atmosphere of carbon dioxide until the viscosity is 22 poises at 20° C. and the iodine value is about 110, is distilled as described in Example 1 at a distillation temperature of 225–230° C. and 420 parts are removed as distillate.

The residue is a brownish oil of 380 poises viscosity at 20° C. and having an iodine value of 125.

We claim:

1. Process for the production of new and valuable drying oils from fish oils having an iodine number greater than approximately 120, which comprises heating such an oil under such conditions as to largely polymerize it, and then subjecting the oil to evaporative distillation in a vacuum of the order of that existing in cathode ray tubes and at such temperature and for such length of time as to evaporate off undesired unpolymerized and unpolymerizable material, including unpolymerized glycerides.

2. Process as covered in claim 1 wherein the distillation is effected between a distilling surface and a condensation surface separated by a distance not greater than the mean free path of the molecules.

3. Process for the production of new and valuable drying oils from fish oils having an iodine number greater than approximately 120, which comprises heating such an oil to a temperature of about 290°–300° C. to cause polymerization of the polymerizable constituents thereof, and then subjecting the polymerized oil containing undesired unpolymerized and unpolymerizable material, including unpolymerized glycerides, to evaporative distillation at a vacuum of the order of that existing in cathode ray tubes and at such temperature and for such length of time as to evaporate off a substantial fraction containing said undesired constituents, yielding as a residue an oil of markedly improved drying properties, practically free of objectionable odor and not tending to deposit stearin-like substances on standing.

4. Process for the production of new and valuable drying oils from fish oils having in the raw condition an idoine value greater than about 120, which comprises subjecting 1000 parts by weight of a polymerized fish oil containing undesired unpolymerized and unpolymerizable material, including unpolymerized glycerides, to evaporative distillation at a vacuum of the order of that existing in cathode ray tubes and at such temperature and for such length of time as to evaporate off a fraction representing about 290 to 420 parts by weight and containing said undesired constituents, yielding as a residue an oil of markedly improved drying properties, practically free of objectionable odor and not tending to deposit stearin-like substances on standing.

5. Process for the production of new and valuable drying oils from raw fish oils having an iodine value greater than about 120 and selected from the class consisting of menhaden, Japanese sardine, herring and Canadian pilchard oils, which comprises polymerizing such an oil and subjecting the polymerized oil to evaporative distillation at a vacuum of the order of that existing in cathode ray tubes and at such temperature and for such length of time as to evaporate off a substantial fraction containing undesired unpolymerized and unpolymerizable material, including unpolymerized glycerides, to secure as a residue a clean, stable oil of markedly improved drying properties.

6. Polymerized fish oil characterized by being capable of drying to a hard, clear film in a short time, having a viscosity of about 385 centipoises at 20° C. and an iodine value of about 103–125.

7. A polymerized fish oil preparation prepared from a fish oil originally having an iodine number greater than about 120 and selected from the class consisting of menhaden, Japanese sardine, herring and Canadian pilchard oils, said preparation characterized by being a clear, viscous, stable liquid free of all materials volatile in a cathode ray vacuum at 225–240° C.

8. Polymerized fish oil characterized by being clear, very viscous, stable, capable of drying to a hard, clear, glossy film and being free of all materials volatile in a cathode ray vacuum at 225°–240° C.

9. A drying oil prepared from Japanese pale sardine oil and characterized by being clear, stable, having a viscosity of about 380–385 poises at 20° C., an iodine value of about 103–125 and free of all materials volatile in a cathode ray vacuum at 225–240° C., and being capable of drying to a hard, clear glossy film.

10. A process for producing stable oils of good drying properties from raw fish oils of the type of pale sardine oil and having an iodine value greater than approximately 120, said process comprising subjecting such an oil to heat at a temperature of approximately 290–300° C. in the absence of oxygen until the iodine value is diminished to approximately 103–110, and then subjecting the oil to short-path distillation in a vacuum of the order of the cathode-ray vacuum and at a temperature of approximately 225°–240° C. until approximately 29 to 42 per cent of the oil is evaporated off, whereby obtaining as residue an oil of viscosity approximately 380 poises at 20° C. capable, when admixed with the usual thinners and driers, of yielding a hard, clear, glossy film in 8 to 20 hours.

ERIC WILLIAM FAWCETT.
ERIC EVERARD WALKER.